United States Patent
Remillard et al.

(10) Patent No.: US 6,730,913 B2
(45) Date of Patent: May 4, 2004

(54) ACTIVE NIGHT VISION SYSTEM FOR VEHICLES EMPLOYING SHORT-PULSE LASER ILLUMINATION AND A GATED CAMERA FOR IMAGE CAPTURE

(75) Inventors: Jeffrey Thomas Remillard, Ypsilanti, MI (US); Willes H. Weber, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 09/683,838

(22) Filed: Feb. 21, 2002

(65) Prior Publication Data

US 2003/0155513 A1 Aug. 21, 2003

(51) Int. Cl.$^7$ .................................................. G01J 5/00
(52) U.S. Cl. ..................................... 250/341.8; 250/330
(58) Field of Search ................................. 250/330, 332, 250/341.8, 333

(56) References Cited

U.S. PATENT DOCUMENTS

| | | | |
|---|---|---|---|
| 4,129,780 A | * 12/1978 | Laughlin | ..................... 250/333 |
| 4,603,250 A | * 7/1986 | Contini et al. | ......... 250/214 VT |
| 4,671,614 A | * 6/1987 | Catalano | ..................... 359/601 |
| 4,920,412 A | 4/1990 | Gerdt et al. | |
| 5,013,917 A | 5/1991 | Ulich | |
| 5,298,905 A | 3/1994 | Dahl | |
| 5,303,020 A | 4/1994 | Croteau | |
| 5,336,899 A | * 8/1994 | Nettleton et al. | ....... 250/559.29 |
| 5,519,209 A | 5/1996 | Rapoport et al. | |
| H1783 H | 2/1999 | McLean | |
| 6,429,429 B1 | * 8/2002 | Fohl et al. | ................... 250/353 |

* cited by examiner

Primary Examiner—Constantine Hannaher
(74) Attorney, Agent, or Firm—Frank A. MacKenzie

(57) ABSTRACT

A method of detecting objects with a night vision system is provided. The night vision system includes a light source and a camera. The method includes activating the light source as a sequence of light pulses wherein each light pulse is increasing in intensity for a predetermined number of pulses to form a pulse train. The camera is activated as a corresponding sequence of detection windows wherein each of the windows corresponds to one of the light pulses for receiving reflected light resulting from the corresponding light pulse. The light pulses and detection windows are configured such that a time delay between each corresponding light pulse and detection window is increasing throughout the pulse train. In another variation, the camera gain is increased throughout the pulse train. In yet another variation, the light pulses have constant amplitude, the camera gain is constant for all pulses, and the number of camera gain windows increases as the delay increases. In all cases, objects nearer the night vision system are imaged with lower intensity light, less camera gain, and/or fewer laser pulses than objects further away to provide a composite image in which the apparent brightness of near and far objects can be controlled.

19 Claims, 4 Drawing Sheets

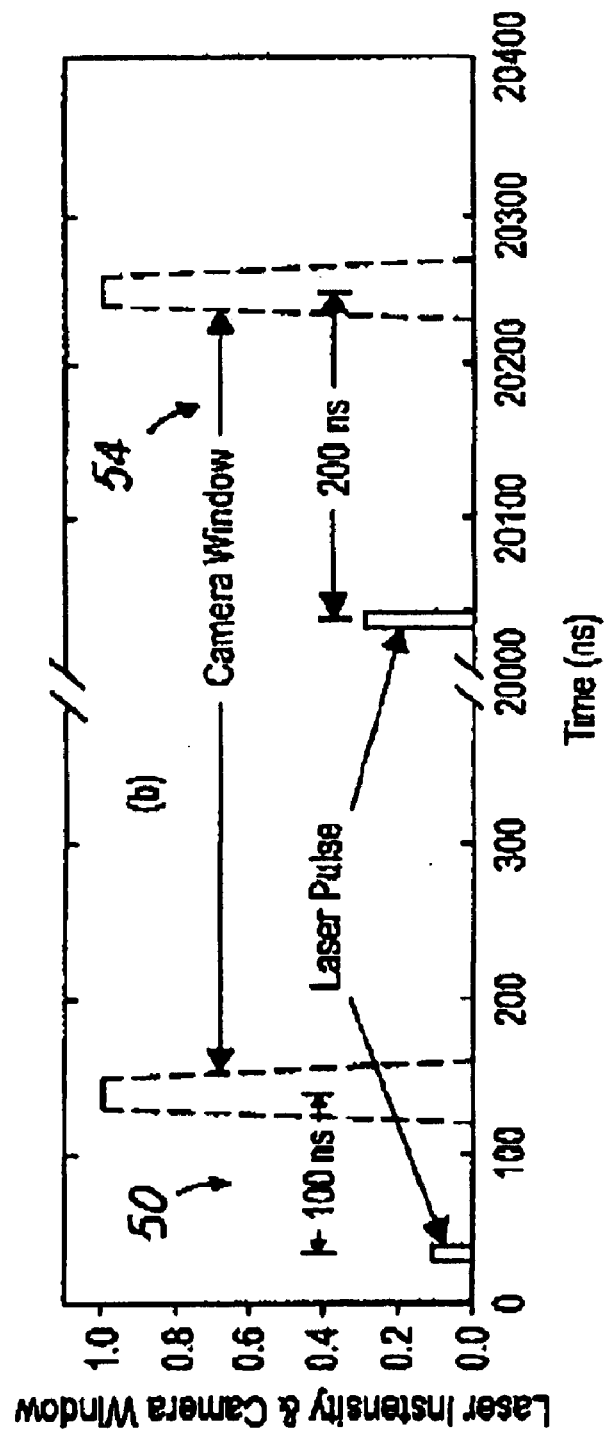

ACTIVE NIGHT VISION SYSTEM FOR VEHICLES EMPLOYING SHORT-PULSE LASER ILLUMINATION AND A GATED CAMERA FOR IMAGE CAPTURE

BACKGROUND OF INVENTION

1. Technical Field

The present invention relates to a night vision system for detecting objects at relatively low visible light levels. In particular, the invention concerns an active night vision system using short-pulse laser illumination and a gated camera for improved distance-based imaging.

2. Background of the Invention

Night vision systems are utilized to allow a user to see objects at relatively low visibility light levels. Night vision systems typically are classified as either passive night vision systems or active night vision systems. In known passive night vision systems used in automotive applications, mid-infrared cameras are used to image objects using the ambient infrared light emitted by the objects in the environment. Mid-infrared night vision systems have relatively few pixels and, accordingly, images formed using such cameras have low video resolution and a relatively narrow field of view. Known active night vision systems utilize a near-infrared (NIR) diode laser or a filtered incandescent light source to generate NIR light. The NIR light is subsequently reflected off objects in the environment and is received by a NIR-sensitive camera. The camera generates a video signal responsive to received light.

An improved active night vision system is disclosed in U.S. Pat. No. 6,429,429 entitled "A Night Vision System Utilizing A Diode Laser Illumination Module And A Method Related Thereto," which is herein incorporated by reference. That application describes an active night vision system that uses a NIR diode laser to illuminate the region forward of the vehicle and a CCD camera to process and display images within the illuminated region. Because NIR light is invisible to the human eye, the laser light can be formed into a high beam pattern to illuminate potential hazards without blinding oncoming vehicle operators.

A drawback of active night vision systems, in general, is that large or highly reflective objects that are close to the vehicle reflect very bright signals which can saturate the imaging system or, at least, obscure or make it difficult to discern objects which are further away. This drawback is particularly bad for fog, where the signal from the fog immediately around the vehicle can make it impossible to see objects farther away. Thus, there is a need for a night vision system and method related thereto that mitigates or eliminates blinding of the vehicle's night vision system by close or highly reflective objects to the detriment of imaging objects that are farther away.

SUMMARY OF INVENTION

The present invention provides a night vision system and method related thereto for detecting objects at relatively low visibility light levels and mitigating the saturation effects of nearby objects. The night vision system uses short-pulse laser illumination and a gated camera for improved distance-based imaging with the added capability of seeing through fog, smoke, and other obscurants. The invention provides an imaging technique that allows the brightness of the apparent illumination to be reduced for nearby objects while, at the same time, being increased for faraway objects.

The night vision system in accordance with one method of the present invention includes a light source and a camera. The method includes activating the light source as a sequence of light pulses wherein each light pulse is increasing in intensity for a predetermined number of pulses to form a pulse train. The camera is activated as a corresponding sequence of detection windows wherein each of the windows corresponds to one of the light pulses for receiving reflected light resulting from the corresponding light pulse. The light pulses and detection windows are configured such that a time delay between each corresponding light pulse and detection window is increasing throughout the pulse train. In this way, objects nearer the night vision system are illuminated with lower intensity light and/or captured with less camera gain than objects further away to provide more uniform imaging of all detected objects. The composite image thus presents all detected objects substantially uniformly on the display.

In another embodiment, the controller uses camera gain modulation to adjust the relative intensity of reflected light for image presentation. In this scenario, the camera gain is increased as the delay for the camera window is increased, and the laser pulse amplitude is maintained constant. Thus, nearby objects are detected with less gain than far-away objects. The resulting composite image displays all detected objects at substantially the same intensity.

In yet another embodiment, the laser pulse amplitude and the camera gain are maintained constant, but the number of camera detection windows for each delay time increases as the delay time increases. In this method, more pulses from faraway objects and fewer pulses from nearby objects contribute to the resulting composite image, which again displays all objects at substantially the same intensity.

The present invention is advantageous in that it allows close, highly reflective objects to be displayed with substantially the same as or even less apparent brightness than objects that are further away. Moreover, under viewing conditions such as heavy smoke or fog, the present invention allows the veiling glare from the obscurants that are near the vehicle to be suppressed in the composite image, which allows the system to "see through" the obscurant. Other advantages and features of the invention will become apparent to one skilled in the art from the following detailed description and the accompanied drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
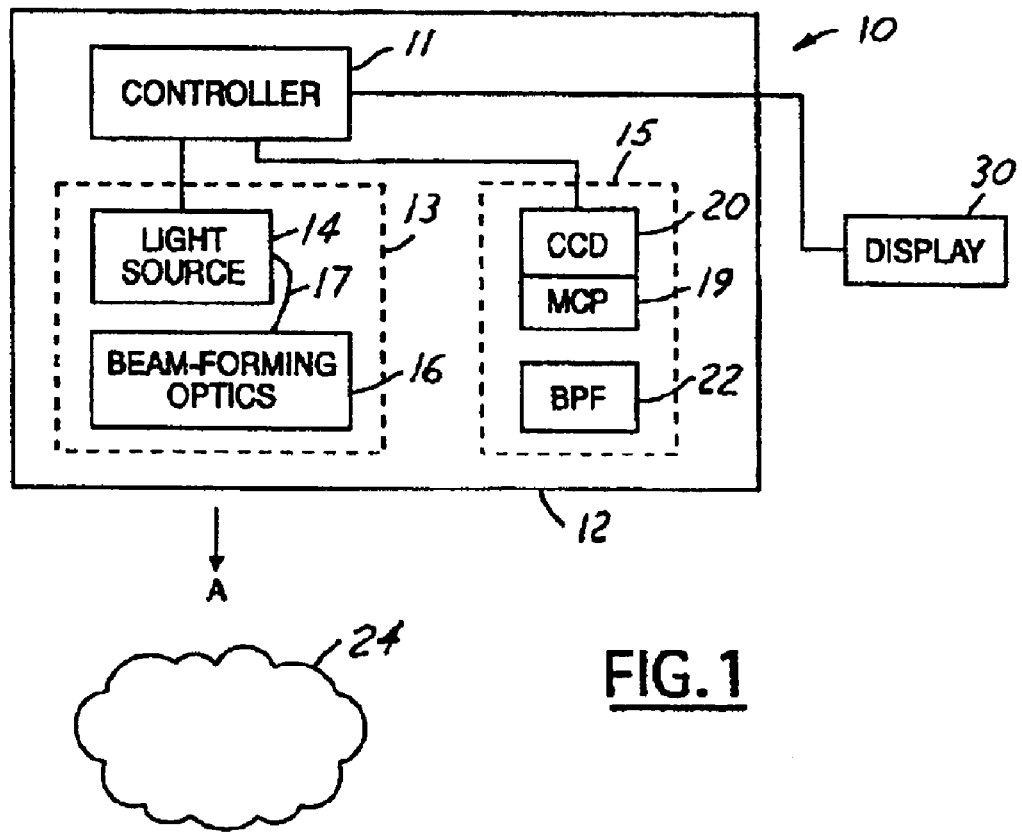
FIG. 1 is a schematic block diagram of a night vision system in accordance with one embodiment of the present invention.

Referring now to the drawings wherein like reference numerals are used to identify identical components in the various views, FIG. 1 illustrates a night vision system 10 for detecting objects at relatively low visibility light levels. The system 10 may be utilized in a plurality of applications. For example, the system 10 may be used in an automotive vehicle to allow a driver to see objects at night that would not be otherwise visible to the naked eye. As illustrated, the system 10 includes a controller 11, an illumination subsystem 13, and a receiver 15. Several of the system components may be included within a housing 12. It should be understood, however, that the components of system 10 containing housing 12 could be disposed at different locations within the vehicle wherein the housing 12 would not be needed. For example, the components of the system 10 could be disposed at different operative locations in the automotive vehicle so that a single housing 12 would be unnecessary. Housing 12 is provided to enclose and protect the various components of the system 10. Housing 12 may be constructed from a plurality of materials including metals and plastics.

As will be discussed in more detail below, the system 10 may be used to detect any reflective object, such as object 24, in operative proximity to the system 10. The system, however, is particularly suited to detecting and displaying to the vehicle operator several objects at varying distances.

The controller 11 is preferably a microprocessor-based controller including drive electronics for the illumination system 13 and receiver 15, and image processing logic for the display system 30. Alternatively, display unit 30 may include its own respective control logic for generating and rendering image data.

The illumination subsystem 13 includes a NIR light source 14, beam-forming optics 16, and a coupler 17 between the two. In a preferred embodiment, the light source is a NIR diode laser; the beam forming optics are comprised of a thin-sheet optical element followed by a holographic diffuser, whose combined purpose is to form a beam pattern in the direction of arrow A comparable to the high-beam pattern used for normal vehicle headlamps; and the coupler between them is a fiber-optic cable, as described in U.S. Pat. No. 6,429,429 entitled "A Night Vision System Utilizing A Diode Laser Illumination Module And A Method Related Thereto." The illumination subsystem illuminates the driving environment without blinding drivers in approaching vehicles, since the NIR light is not visible to the human eye.

The light source may comprise a NIR diode laser. In one embodiment, the light source is a single stripe diode laser, model number S-81-3000-C-200-H manufactured by Coherent, Inc. of Santa Clara, Calif. The laser light source is capable of producing sufficiently short pulses of light, i.e., 10–20 ns, for distance-specific imaging. The light source may be disposed in a housing 12. Further, the coupler 17 may be a fiber-optic cable, in which case the NIR light source 14 may be connected to a first end of the fiber optic cable using a light coupler (not shown) as known by those skilled in the art. A second end of fiber optic cable is operatively disposed adjacent to the thin sheet optical element (not shown). Alternatively, the light source could be directly coupled to the thin-sheet optical element through a rigid connector, in which case the coupler would be a simple lens or reflective component. Although the system 10 preferably utilizes a NIR laser light source, an alternate embodiment of system 10 may utilize another type of NIR light source, as long as it is capable of pulsed operation, in lieu of the infrared diode laser.

The receiver 15 includes a NIR-sensitive camera 20 and optical band pass filter 22. The NIR-sensitive camera 20 provides a video signal responsive to reflected infrared light received by the camera 20. The camera 20 is conventional in the art and may comprise a CCD camera or a CMOS camera. Preferably, the camera is a high-speed gated camera. In one embodiment of the system 10, the CCD camera is camera model number 4 Quik E by Stanford Computer Optics, Inc. A micro-channel plate (MCP) intensifier 19 is also included. The high voltage on the MCP 19 is used to control the camera gain for each pulse as described in more detail with reference to FIG. 3 below.

Light emitted by the illumination subsystem 13 is reflected off the object 24 and the environment and is received by the NIR-sensitive camera 20. The video signal is transmitted to the controller 11 or directly to the display module 30 where it is processed and displayed to allow the vehicle operator to see the object 24. The display 30 may be a television monitor, a CRT, LCD, or heads up display positioned within the automotive vehicle to allow the user to see objects illuminated by the system 10.

The optical band pass filter 22 is provided to filter the infrared light reflected from the object 24. In particular, the filter 22 only allows light within the NIR light spectrum to be received by the camera 20. Preferably, the filter 22 allows a maximum transmission of light at a wavelength equal to the wavelength of light generated by the NIR light source. In one example, this is the NIR range of 800–900 nm. An advantage of using the filter 22 is that the filter 22 prevents saturation of the pixel elements (i.e., blooming) in the camera 20 by visible light emitted from the headlamps of other automotive vehicles. The filter 22 is preferably disposed proximate to a receiving lens in the camera 20.

Figure 2A:
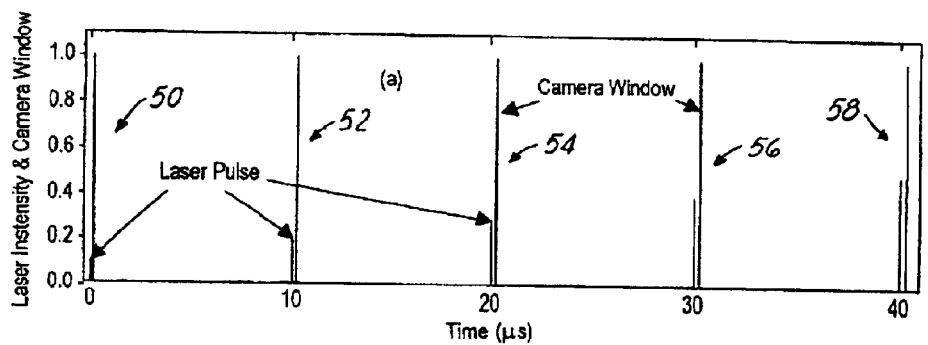
FIGS. 2A and 2B are graphs of the operation of the night vision system of FIG. 1 in accordance with one embodiment of the present invention.
Figure 2B:
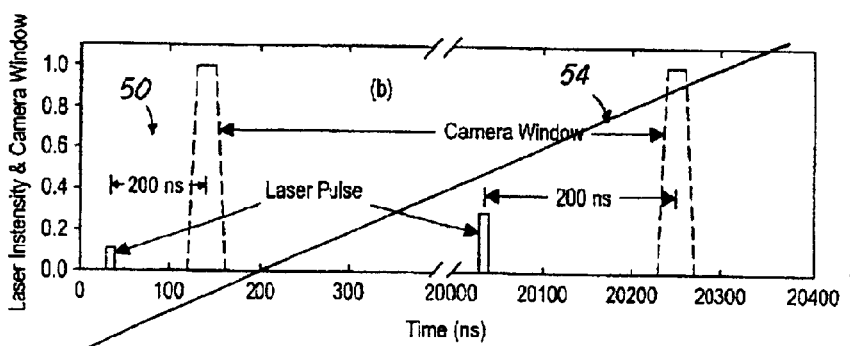

Referring now to FIGS. 2A and 2B, there are shown graphs of the operation of the night vision system of FIG. 1 in accordance with one embodiment of the present invention. A method of operation shown in FIGS. 2A and 2B is a laser pulsed amplitude modulation method of operation wherein the pulse amplitude of the light source, i.e., the laser diode, is increased as the camera window delay is increased. The graph of FIG. 2A shows five laser pulse and camera window operation sequences 50, 52, 54, 56, 58. The traces shown in FIG. 2A schematically illustrate the laser pulses and the corresponding delayed camera windows. In the example shown, the laser pulse width is set to 10 ns and the camera window to 20 ns. These values are shown for illustrative purposes only and, in practice, the pulse widths could be somewhat smaller or larger without departing from the principals of the present invention. The laser pulses are synchronized with the camera detection window, with the delay between the two corresponding to the desired imaging distance. In the first sequence 50, the camera delay is set to 100 ns after the laser pulse. This corresponds to a distance of approximately 15 meters. For each subsequent sequence 52, 54, 56, 58, the camera window delay is increased by 50 ns. A single pulse train would thus contain a series of pulses, each with an increase in the camera delay, and the maximum of which corresponds to the maximum desirable imaging distance. For example, a maximum imaging distance of 300 m corresponds to a delay of 2000 ns, which would require a pulse train of 40 pulses if the delay is increased by 50 ns/pulse as is shown in FIGS. 2A and 2B. Given a video frame rate of 30 frames/sec, one video frame would be acquired by adding the signals from approximately 75 pulse trains of the sort partially shown in the traces of FIGS. 2A and 2B.

FIG. 2B shows a detail of two of the pulse sequences 50, 54 of FIG. 2A. As can be seen in FIG. 2B, in the first pulse sequence, a laser pulse is approximately 10 ns in width and the camera window is approximately 20 ns in width at a delay of 100 ns after the laser pulse. Two sequences later, in pulse sequence 54, the camera window delay has increased to 200 ns and the amplitude of the laser pulse has increased. In this way, objects that are nearer the vehicle (approximately 15 meters) would be imaged by the first pulse sequence 50, which has relatively low intensity illumination. In contrast, objects which are further from the vehicle would be imaged by ever-increasing light intensity pulses. In this way, the composite video image comprising the sum of the signals of a predetermined pulse train of the forms shown in FIGS. 2A and 2B results in a presentation of all objects detected at all distances being substantially at the same intensity level. Of course, the relative intensity change could be adjusted for optimum image quality and contrast. For example, in poor visibility situations such as fog or rain, the amplitude of the laser pulses could be increased at a greater rate whereas in good visibility situations, the laser amplitude pulses could be increased at a lesser rate.

Figure 3A:
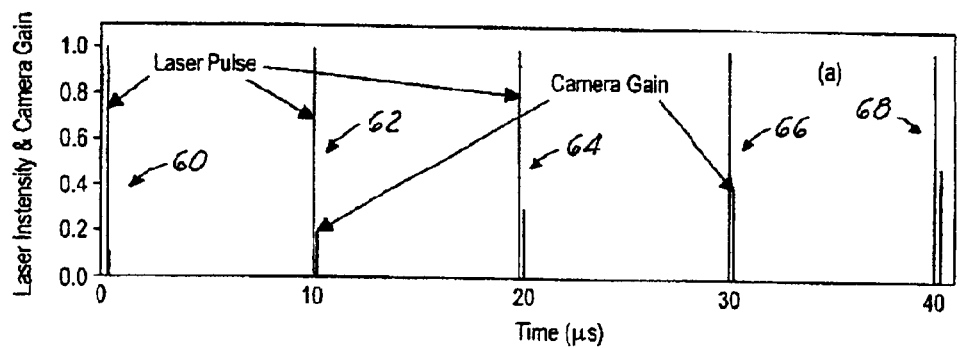
FIGS. 3A and 3B are graphs of the operation of the night vision system of FIG. 1 in accordance with another embodiment of the present invention.
Figure 3B:
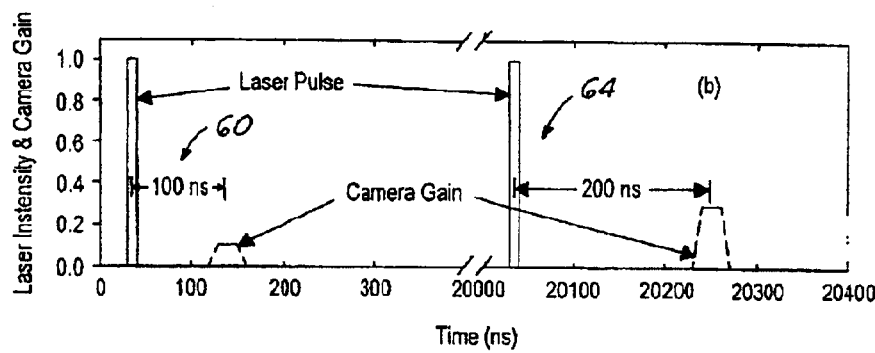

Referring now to FIGS. 3A and 3B, there are shown graphs of the operation of the system of FIG. 1 in accordance with another embodiment of the present invention. The laser pulse and camera window traces presented in FIGS. 3A and 3B show the opposite of those shown in FIGS. 2A and 2B. Specifically, the amplitude of the laser pulse for each of the pulse sequences 60–68 is maintained constant, while the gain of the camera is increased as the delay between the laser pulse and camera window increases. A detail of two of the pulse sequences 60, 64 is shown in FIG. 3B. The timing sequence of the laser pulses and camera windows are otherwise the same as in FIGS. 2A and 2B. Thus, image capture is the same as in FIGS. 2A and 2B, in that for each video frame, a predetermined number of pulse sequences of the sort shown in FIGS. 3A and 3B would be added to form a composite video image wherein all of the detected objects are presented at substantially the same intensity level, or at a relative intensity level chosen for optimum viewing. In the example shown in FIGS. 3A and 3B, the camera gain is controlled by the high voltage on the MCP 19 of FIG. 1. The method of operation is otherwise equivalent to that of FIGS. 2A and 2B except that the camera gain used to capture each reflected pulse is changed rather than the intensity of each pulse.

In another alternate embodiment, both the laser pulse and the camera window gain can be increased as the delay is increased to increase the intensity of detected distant objects relative to those nearer to the vehicle.

In another embodiment, a single pulse train per video frame containing all delays necessary to cover the full viewing distance is provided, but the number of pulses for each delay is varied. The single pulse train would thus contain several thousand pulses, all of which would have the same laser pulse amplitude and camera window gain. The number of pulses with short delays, however, for the camera window would be much less than the number of pulses associated with long delays. The variation of pulse number with the delay then provides a basis for optimum image quality. Specifically, further away objects will contribute many light pulses to a single video frame, whereas objects nearer the system will contribute relatively fewer light pulses to a video frame.

Figure 4:
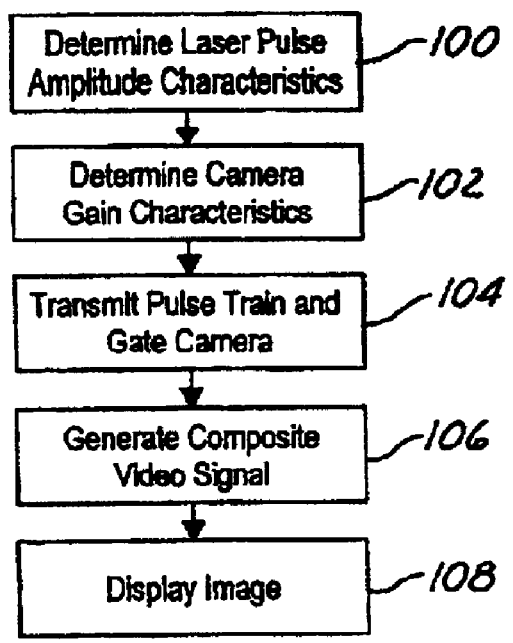
FIG. 4 is a logic flow diagram of one method of operating the night vision system according to the present invention.

Referring now to FIG. 4, there is shown a logic flow diagram of one method of operating the night vision system according to the present invention. The method begins in step 100 by determining the laser pulse-amplitude characteristics for the predetermined pulse train. In one embodiment, the amplitude of the laser pulse increases with each subsequent pulse in the pulse train (FIGS. 2A and 2B). In another embodiment, the amplitude of the laser pulse may remain constant (FIGS. 3A and 3B). In step 102, the camera gain characteristics are determined for the pulse train. The camera gain for the corresponding laser pulse may be constant (FIGS. 2A and 2B) or increasing with each subsequent pulse (FIGS. 3A and 3B). The delay between the camera shutter and the laser pulse is representative of a predetermined distance from the night vision system. Thus, the shorter the delay, the nearer the object, and the longer the delay, the further the object. By increasing the intensity of the light source which illuminates the object and, hence, the reflective signal as the distance (delay) increases, the relative signal strength between reflections from near objects can be made substantially the same as or even weaker than that of relatively far objects.

In step 106, a composite video signal is generated by adding the signals from a plurality of pulse trains. For example, for a NIR laser emitting in the 800–900 nm range, at a pulse width of 10 ns and a camera window of 20 ns and a camera delay of 100 ns for the first pulse increasing by 50 ns for subsequent pulses, the maximum visibility distance of 300 m corresponds to a delay of 2,000 ns, which requires a pulse train of 40 pulses, if the delay is increased by 50 ns/pulse as shown in FIGS. 2A and 3A. At a video frame rate of 30 frames/sec, one video frame is acquired by adding the signals from approximately 75 pulse trains containing 40 pulses each.

In step 108, the image is displayed on the system display 30 by known methods such that the operator is made aware of any objects within the system field-of-view.

From the foregoing, it can be seen that there has been brought to the art a new and improved vehicle night vision system which has advantages over prior vehicle night vision systems. While the invention has been described in connection with one or more embodiments, it should be understood that the invention is not limited to those embodiments. Thus, the delays or pulse or window widths presented herein, as well as the exemplary night vision system in which the present invention may be used to advantage, are merely examples and are not meant to be limiting. On the contrary, the invention covers all alternatives, modifications and equivalents as may be included within the spirit and scope of the appended claims.

What is claimed is:

1. A method of detecting objects with a night vision system having a near infrared light source and a camera, the method comprising:

activating said light source in the form of a sequence of light pulses wherein each light pulse is increasing in intensity for a predetermined number of pulses to form a pulse train; and activating said camera in the form of a corresponding sequence of non-overlapping detection windows wherein each of said windows corresponds to one of said light pulses for receiving reflected light resulting from said corresponding light pulse and a time delay between each corresponding light pulse and detection window is increasing throughout said pulse train, said light pulse intensity and said corresponding time delay being selected to result in a substantially constant reflected image signal.

2. A method according to claim 1 further comprising summing all reflected light signals in said pulse train to form a composite image of detected objects within a field of view of said night vision system.

3. A method according to claim 1 further comprising generating a video image from said reflected light signals in a plurality of pulse trains and displaying said video image on an operator display.

4. A method according to claim 1 wherein each light pulse and each detection window has a constant duration.

5. A method according to claim 4 wherein the duration of each detection window is approximately twice as long as the duration of each light pulse.

6. A method according to claim 1 wherein the time delay between each subsequent corresponding light pulse and detection window increases by approximately 50 ns.

7. A method according to claim 6 wherein said pulse train is approximately 40 corresponding light pulses and detection windows.

8. A method according to claim 1 wherein a gain of each detection window is increasing throughout said pulse train.

9. A method according to claim 1 wherein said light source is a NIR diode laser and said camera is a high speed NIR-sensitive camera.

10. A method of detecting objects with a night vision system having a near infrared light source and a camera, the method comprising:

activating said light source in the form of a sequence of constant intensity light pulses to form a pulse train; and activating said camera in the form of a corresponding sequence of non-overlapping detection windows wherein each of said windows corresponds to one of said light pulses for receiving reflected light resulting from said corresponding light pulse and wherein each detection window has an increasing gain throughout said pulse train and a time delay between each corresponding light pulse and detection window is increasing throughout said pulse train, said detection window gain and said corresponding time delay being selected to result in a substantially constant reflected image signal.

11. A method according to claim 10 further comprising summing all reflected light signals in said pulse train to form a composite image of detected objects within said night vision system field of view.

12. A method according to claim 10 further comprising generating a video image from said reflected light signals in a plurality of pulse trains and displaying said video image on an operator display.

13. A method according to claim 10 wherein each light pulse and each detection window has a constant duration.

14. A method according to claim 13 wherein the duration of each detection window is approximately twice as long as the duration of each light pulse.

15. A method according to claim 10 wherein the time delay between each subsequent corresponding light pulse and detection window increases by approximately 50 ns.

16. A method according to claim 10 wherein said light source is a NIR diode laser and said camera is a high-speed NIR-sensitive camera.

17. A method of detecting objects with a night vision system having a near infrared light source and a camera, the method comprising:

activating said light source in the form of a plurality of constant intensity light pulses to form a pulse train; and activating said camera in the form of a plurality of non-overlapping detection windows throughout said pulse train for receiving reflected light resulting from said corresponding light pulses and wherein a time delay between each subsequent detection window and a window length is increasing throughout said pulse train, said light pulses and detection windows being configured such that objects nearer the night vision system are imaged by fewer light pulses than objects further away from said night vision system.

18. A method according to claim 17 wherein a duration of each detection window is longer than a duration of each light pulse.

19. A method according to claim 17 further comprising summing all reflected light signals in said pulse train to form a composite image of detected objects within said night vision system field of view.

* * * * *